United States Patent

[11] 3,554,076

| | | | |
|---|---|---|---|
| [72] | Inventor | Alfred H. Bellows |
| | | Cambridge, Mass. |
| [21] | Appl. No. | 797,550 |
| [22] | Filed | Feb. 7, 1969 |
| [45] | Patented | Jan. 12, 1971 |
| [73] | Assignee | Polaroid Corporation |
| | | Cambridge, Mass. |
| | | a corporation of Delaware |

[54] COMPACT VIEWFINDER WITH TORIC MIRRORS
6 Claims, 6 Drawing Figs.

[52] U.S. Cl. .................................................. 88/1.5
[51] Int. Cl. .......................................... G03b 13/02
[50] Field of Search .......................................... 88/1.5

[56] References Cited
FOREIGN PATENTS
1,124,020  10/1956  France ........................

*Primary Examiner*—Ronald L. Wibert
*Assistant Examiner*—Orville B. Chew, II
*Attorneys*—Brown and Mikulka, William D. Roberson and Frederick H. Brustman ABSTRACT: A toric reflecting element is associated with each major straight line segment of a reticle in a compact viewfinder. The strong curve of the toric element forms a one dimensional virtual image of the reticle line, much as a cylindrical mirror does. The weaker secondary curve of the toric element brings the extremities of the line into focus for the eye at short eye relief distances from the viewfinder.

PATENTED JAN 12 1971　　　　　　　　　　　　　　　　3,554,076
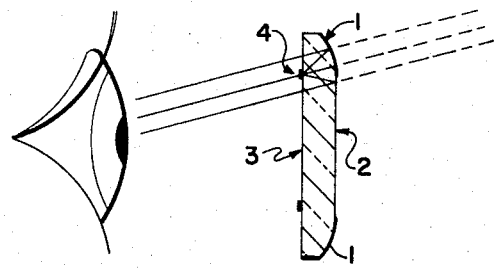
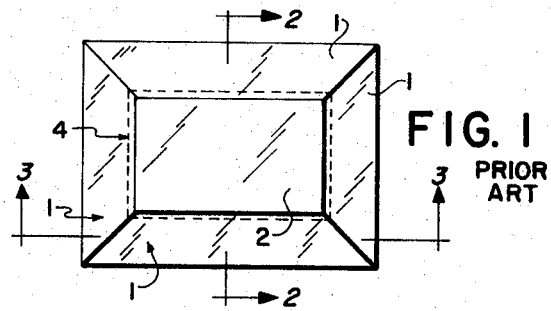
FIG. 2 PRIOR ART　　　　　　FIG. 1 PRIOR ART
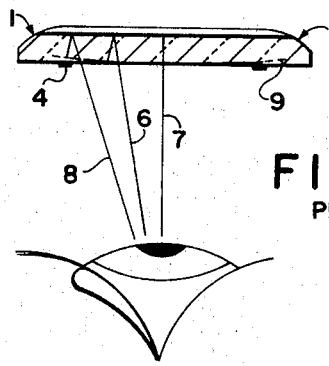
FIG. 3 PRIOR ART
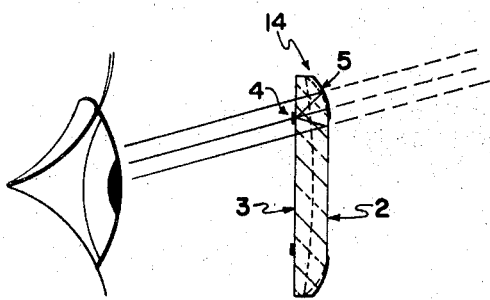
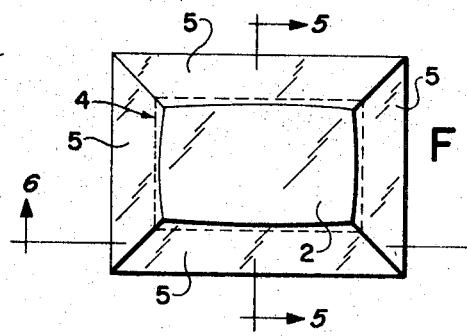
FIG. 5　　　　　　FIG. 4
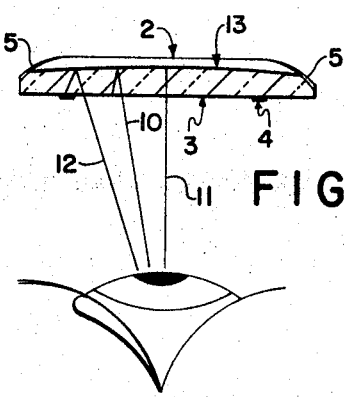
FIG. 6
INVENTOR.
ALFRED H. BELLOWS
BY Brown and Mikulka
and
Frederick H. Brustman
ATTORNEYS

COMPACT VIEWFINDER WITH TORIC MIRRORS

BACKGROUND OF THE INVENTION

This invention relates to viewfinders which use a virtual image of a reticle to outline within a frame the useful field of an optical device. One embodiment of such a viewfinder takes advantage of the reticle shape to modify the optical design to a more compact form. Common camera reticles are generally composed of several substantially straight lines arranged in a rectangle. Images of the straight lines are reflected to the observer's eye by a cylindrical mirror parallel to each major straight line element of the reticle and spaced apart from the straight line by a distance equal to the focal length of the cylindrical mirror. Each cylindrical mirror forms a virtual image at infinity of the reticle line with which it is associated. A series of one-dimensional images is formed which the eye fuses into a rectangular shape. The conglomeration of the several one-dimensional images form an acceptable reticle image because there is no detail to be resolved along the length of the individual straight lines. The inherent defect in the use of cylindrical mirrors for this purpose is that the corners of the virtual image are out of focus. The observer's eye sees the extremities of the lines in the cylindrical mirrors at an oblique angle. The focal length of the cylinders is different for images viewed at an oblique angle than those viewed normal to the cylinder surface. Thus, when the central portions of the reticle lines are focused, the extremities forming the corners of the image are out of focus for an observer with his eye at the usual distance from a viewfinder.

SUMMARY OF THE INVENTION

An object of this invention is an improved compact virtual image forming viewfinder.

Another object of this invention is a compact viewfinder which produces a frame image having sharply focused lines in the corners.

Still another object of this invention is a compact viewfinder having a frame image which is everywhere in focus.

Another purpose of the invention is to provide a compact virtual image forming viewfinder using individual focusing elements to image each linear segment of a reticle to be everywhere in focus.

Another purpose of the invention is a compact viewfinder comprised of toric mirrors for forming sharp images of the elements of a reticle.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

DESCRIPTION OF THE DRAWING

For a fuller understanding of the nature and objects of the invention, reference should be had to the following detailed description taken in connection with the accompanying drawing wherein:

FIG. 1 is a front view of a prior art viewfinder;
FIG. 2 is a section of FIG. 1;
FIG. 3 is a different section of FIG. 1;
FIG. 4 is a front view of a viewfinder according to this invention;
FIG. 5 is a cross section of FIG. 4; and
FIG. 6 is a different cross section of FIG. 4.

DETAILED DESCRIPTION OF THE INVENTION

To more fully understand and appreciate the advantages of this invention, an understanding of the prior art is necessary. FIG. 1 shows a prior art viewfinder in a front view looking towards the entrance window 2. The viewfinder is comprised of a rectangular frame defining reticle means 4 consisting of a plurality of reticle elements extended along straight lines. The virtual image forming elements of the viewfinder are cylindrical mirrors, 1, arranged in a rectangle so that each individual cylindrical reflecting element 1 is associated with a particular straight line segment of the reticle 4. In FIG. 2, which is a cross section of the viewfinder shown in FIG. 1, the optical arrangement is clearer. The reticle 4 is located at the exit window 3 of the viewfinder. The cylindrical reflective image-forming elements 1 are located at the entrance window 2 of the viewfinder. The cylindrical elements 1 and the reticle elements 4 are spaced apart by a distance equal to the focal length of the cylindrical elements. Each cylindrical element then forms a virtual image, located at infinity, of the associated reticle element. Because only a sagittal image of the line element of the reticle 4 is formed by the cylindrical mirror 1, no tangential image exists. Because the object is a straight line of comparatively long length, the lack of a tangential image does not significantly hinder the perception of a straight line image by the observer, because there is no detail to be perceived along the length of the line. The observer looking through the viewfinder will see four virtual line images projected out at infinity; one for each of the line imaging cylinders.

The distracting flaw in viewfinders employing cylindrical elements is that the corners of the frame appear to be out of focus. This is caused by the fact that the eye views the extremities of the line which lie in the corners of the viewfinder by using the cylindrical surfaces at an oblique angle. This results effectively in a change in focal length of the cylindrical surface and an apparent shortening of that focal length. The result is that the actual line of sharp focus for the cylindrical element, seen by one using the viewfinder, is curved in space toward the cylindrical element. This condition is shown in FIG. 3 which is a section taken through a cylindrical element of the viewfinder at a point of intersection of several rays of light drawn to the observer's eye. The ray 7 is at a normal to the cylindrical element 1, and focuses in the plane that the reticle is located in. The ray 6 is at an angle to the cylindrical surface and it terminates at a point of sharp focus slightly forward of the reticle plane though not at a significant distance in front of it. The ray 8 represents a ray at an even greater oblique angle to the straight surface of the cylindrical element 1. The focal point for light along this line in conjunction with the cylinder is even further away from the plane of the reticle. The line of sharp focus for an observer is shown as the dashed line 9. It is seen that the line of sharp focus 9 lies in front of the flat reticle 4 at the extremities of the reticle line resulting in the ends of the reticle line appearing out of focus to the observer.

It is this out of focus condition, at the extremities of the straight lines comprising the reticle, which this invention corrects. The compact viewfinder of this invention employs toric reflecting surfaces 5, as shown in FIGS. 4, 5 and 6, which have the advantage of retaining the compact features of a viewfinder which uses individual imaging elements for each straight line segment of the reticle 4. The secondary curve of the toric surface 5 flattens the line of sharp focus so that it appears a straight line corresponding to the straight line of the reticle 4.

In FIG. 4 a view looking towards the entrance window of the compact viewfinder of this invention is shown. A reticle 4 which is made of several straight lines is formed on the rear surface of a solid transparent optical element 14. A set of toric reflecting image-forming surfaces 5 are formed on the front surface of the optical element 14.

The reticle lines 4 on the rear surface of the element 14 are arranged about an exit window 3. On the front surface the toric reflecting surfaces are arranged around an entrance window 2. The number of toric reflecting surfaces 5 corresponds to the number of straight line elements in the reticle 4. The toric reflecting surfaces 5 are generally opposite and aligned with the straight line elements in the reticle 4.

FIG. 5 shows a clear representation of the relationship between the reticle and the image-forming toric surfaces 5. FIG. 5 is a cross section of the viewfinder. In FIG. 5 it can be seen that the reticle 4 is arranged around the exit window 3 while toric image-forming elements 5 are arranged around the entrance window 2. The distance between the toric image-forming element 5 and the reticle 4 is equal to the steep curve focal length of the toric element 5. Toric element 5 reflects light from the reticle 4 causing it to form a virtual image which appears to the observer to be located at infinity. The observer sees four images at right angles located at infinity which appear to form the reference frame about the scene observed through the viewfinder. The use of a toric surface 5 to form the image of the straight line reticle element at 4 results in the image of the straight line element being in sharp focus at its extremities as well as at the center.

This is the case in this invention because the secondary, weaker, curve of the toric surface compensates for the oblique angle which the observer uses the toric surface at by moving the image-forming surface closer to the object. This is clearly illustrated in FIG. 6 which is a section through one of the toric elements. The secondary curve of the toric surface with the section for viewing is shown as the curve 13. The secondary curve 13 of the toric surface 5 has a radius approximately equal to twice the eye relief and the optical thickness of the viewfinder. Rays 10, 11 and 12 represent rays of light proceeding from various points on the reticle to the toric imaging surface and intersecting that surface at the line 13 thereon and proceeding to the eye. Ray 11 is a ray of light normally incident on the reflecting surface 5 from the center of the reticle. Line 10 represents a ray of light intersecting the surface 5 at a slightly oblique angle before proceeding to the eye of the observer and 12 is a ray of light which intersects surface 5 at a greater oblique angle before proceeding to the eye. It can be seen that the secondary curvature of the toric surface 5, as represented by the curve 13, flattens the field of view so that it lies in a plane coincident with the reticle. Therefore, the observer will see a sharp image of the reticle for its entire length. The corners of the frame formed by the viewfinder about the scene will thus appear quite sharp when seen through the viewfinder of this invention.

The viewfinder which employs toric reflecting surfaces to form individual virtual images of the component lines of the reticle is quite compact and results in an image of the reticle which everywhere appears in focus to the observer.

While the description of the invention has been of the invention in the form of a single solid transparent element wherein the essential toric mirror surfaces and reticles and entrance and exit windows have been molded into the surface of the optical element, those skilled in the art will appreciate that the invention can be embodied in a series of several individual optical elements.

Since certain changes may be made in the above apparatus without departing from the scope of the invention herein involved, it is intended that all matter contained in the above description or shown in the accompanying drawing shall be interpreted as illustrative and not in a limiting sense.

I claim:

1. A compact viewfinder comprising means for observing a field of view, reticle means, including a plurality of reticle elements extending along straight lines and means for superimposing a virtual image of said reticle means on the field of view observed through said viewfinder including a plurality of toric surfaces, each associated with one of said reticle elements and having reflecting properties which cooperate with said reticle elements, said toric surface having different curvatures in each of two directions, the weaker of said curvatures extending generally along said reticle element and the stronger of said curvatures extending transversely to said reticle element.

2. A compact viewfinder as in claim 1 having entrance and exit windows and wherein said reticle means is at said exit window and said toric surfaces are located about said entrance window.

3. A compact viewfinder as in claim 1 wherein the images of said reticle means define a frame of reference.

4. A viewfinder as in claim 1 wherein the weaker curve of said toric surface has a radius approximately equal to twice the distance between the entrance window and the location of the observing eye.

5. A compact viewfinder comprising entrance and exit windows arranged for observing a field of view, reticle means including a plurality of reticle elements extended along straight lines at said exit window, a plurality of toric mirrors disposed about said entrance window, each of said toric mirrors being positioned so that the stronger curve of said toric mirror cooperates with one of said reticle elements forming a virtual image of said reticle means which appears superimposed on said field of view and the weaker curve of said toric mirror bending toward the extremities of said cooperating reticle element.

6. A compact viewfinder comprising a solid transparent optical element having:
an entrance window on the front surface;
an exit window on the rear surface;
frame defining reticle means composed of a plurality of reticle elements extending along straight lines located at said exit window;
a plurality of toric mirrors on said front surface disposed around said entrance window;
the stronger curve of said toric mirrors having a radius approximately equal to twice the distance between said front and rear surfaces;
the weaker curve of said toric mirror to have a radius approximately twice the distance between said entrance window and the location of the observing eye;
each of said toric mirrors being positioned to cooperate with one of said reticle elements of said reticle means so as to form a virtual image of said reticle element and project said image through said exit window.